Aug. 18, 1953 — J. B. HIRSCHMANN — 2,648,843
GOGGLES
Filed Jan. 10, 1951
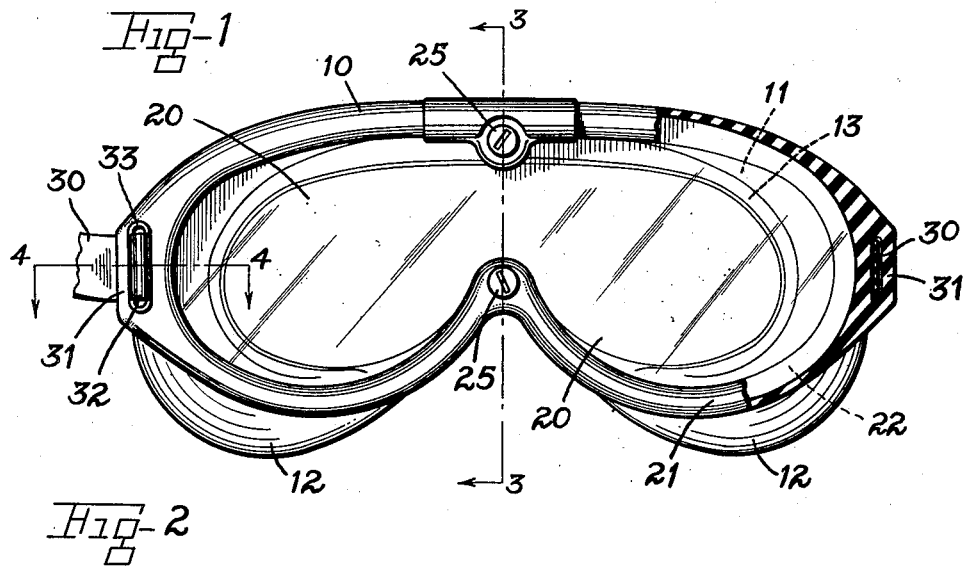
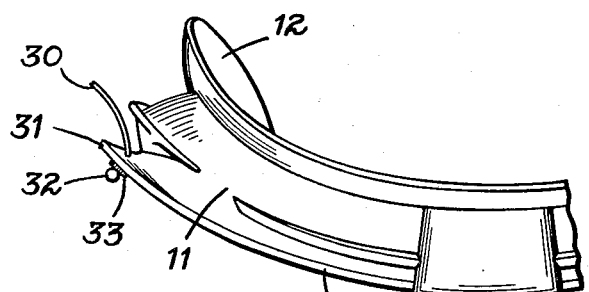
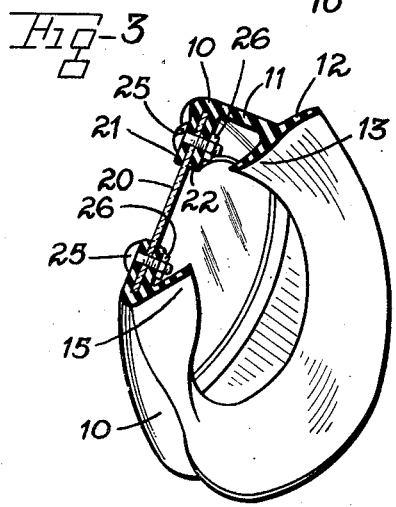
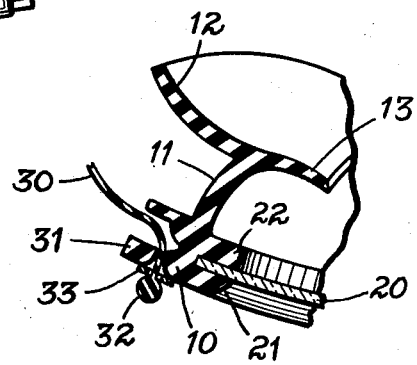
Inventor
JACK B. HIRSCHMANN
By Marechal & Biebel
Attorneys Patented Aug. 18, 1953

2,648,843

UNITED STATES PATENT OFFICE 2,648,843

GOGGLES

Jack B. Hirschmann, Fairhaven, Mass.

Application January 10, 1951, Serial No. 205,327

2 Claims. (Cl. 2—14)

This invention relates to goggles for eye protection.

The invention has particular relation to the provision of a goggle for industrial eye protection purposes by personnel working under conditions involving exposure to gas or possible splashing of corrosive liquids, and the principal object of the invention is to provide a goggle for such purposes which is adequately gas tight to assure proper protection to the eyes of the wearer under such working conditions, while at the same time including a lens sealed into the frame for protective action in use but quickly and easily replaceable in the event of abrasion or other damage thereto.

Other objects and advantages of the invention will be apparent from the following description, the accompanying drawing and the appended claims.

In the drawing—

Fig. 1 is a view in front elevation illustrating a goggle constructed in accordance with the invention, the view being partly broken away substantially on the center of the goggle lens to illustrate details of internal construction;

Fig. 2 is a fragmentary top plan view of the goggle;

Fig. 3 is a section on the line 3—3 of Fig. 1; and

Fig. 4 is a fragmentary section taken on the line 4—4 of Fig. 1 and on a larger scale.

In the drawing, which illustrates a preferred embodiment of the invention, the goggle is shown as including a one-piece frame which is readily molded from rubber or like material of suitable flexibility. This frame includes a front rim portion 10 and a portion 11 which extends rearwardly from the rim to define the eye chamber of the goggle, and the frame portion 11 terminates in a double flange portion 12 and 13 for engaging the face of the wearer. As shown in Figs. 3 and 4, the outer flange 12 is formed to fit smoothly around the goggle against the forehead, temples and cheeks of the wearer but is relieved at the nose receiving portion of the goggle, and the flange portion 13 extends generally inwardly from the frame portion 11 for similarly seating against the face of the wearer and includes a central web portion 15 adapted to seat on the bridge of the nose of the wearer to complete the sealing action in the junction between the goggle frame and the wearer's face.

The rim 10 of the goggle is formed to define a single viewing aperture comprising a pair of enlarged eye portions and a connecting portion of reduced vertical extent at the center of the goggle and above the wearer's nose. A lens 20 complementary in shape to the rim is received therein, and this lens may be formed of a suitable transparent plastic material, satisfactory results having been obtained with cellulose acetate. In order to seal the lens in the frame while still providing for ready removal and replacement thereof in the event of scratching or other damage to the lens, the rim 10 is formed to include a pair of flange portions 21 and 22 which cooperate to define a channel for receiving the periphery of the lens as best seen in Figs. 3 and 4. These flange portions overlap a strip along the edge of the lens of sufficient width to assure adequate sealing against the passage of gas or liquid around the edge of the lens into the eye chamber from without. Also, the flanges 21 and 22 are formed at the center portion of the goggle with extensions of sufficient area to receive a pair of bolts 25 which extend through holes in the lens and are provided with cooperating nuts 26. With these bolts and nuts formed of stainless steel, the lens is firmly secured within the frame against possible accidental dislodgment in use, while at the same time upon removal of the nuts and bolts, the lens can be quickly and easily snapped out of the frame and replaced with a new lens when desired.

A head strap 30 is provided for securing the goggle in position on the head of the wearer. In order to attach this head strap to the goggle without the possibility of creating an opening capable of admitting corrosive fluid into the interior of the eye chamber, the goggle frame is formed at either end with a lug portion 31 having a slot therethrough for receiving the head strap. Each end of the head strap is formed with an enlarged portion 32, and a metal or plastic grommet or plate 33 slotted to receive the strap is positioned thereon between the enlargement 32 and the front of each lug 31. With the strap thus connected with the frame at its ends and entirely exteriorly of the eye chamber, the frame readily adapts itself to the face of the wearer to provide the desired closely sealed fit in place.

It will accordingly be seen that when this goggle is assembled as described with the flexible lens and attaching bolts therefor in place and is fitted on a wearer, the eye chamber of the goggle is entirely sealed against the possible passage of corrosive fluids capable of injuring the wearer's eyes, the flanges 12 and 13 providing an effective seal at the junction between the goggle frame and the face, and the frame being entirely free of openings, including even ventilation openings, which might otherwise permit gas to pass therethrough. At the same time, the goggle provides the advantages of light weight and comfort as well as adaptability to faces and heads of different sizes and shapes which cannot readily be obtained with a glass or like rigid lens construction. Furthermore, if the plastic lens is damaged or worn, it is quickly and easily replaced without affecting the wearability or sealed construction of the goggle.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A goggle of the single aperture and replaceable lens type for protection against gas, corrosive liquids and the like comprising a one-piece frame including a front rim portion and a portion extending rearwardly from said rim to define an eye chamber, a peripheral flange on said rearwardly extending portion adapted to fit closely against the face of the wearer to seal the junction therebetween, said rim defining a pair of eye apertures connected by a portion of reduced vertical extent above the nose of the wearer, a one-piece lens of flexible material adapted to be received within said rim and of complementary shape thereto, inner and outer spaced flanges on the inner periphery of said rim forming a channel for receiving the periphery of said lens, locking means extending through said flanges and said lens for securing said lens in compressed relation between said flanges to seal against the passage of gas around the edge thereof into the interior of said eye chamber, said locking means being releasable to provide for ready removal and replacement of said lens, said frame being entirely free of openings into said eye chamber except for said lens receiving portion to seal said eye chamber against the passage of gas from without, a head strap for supporting said frame on the head of the wearer, and means for securing the ends of said head strap to said frame entirely exteriorly of said eye chamber to maintain said eye chamber sealed against gas in position on the head of the wearer.

2. A goggle of the single aperture and replaceable lens type for protection against gas, corrosive liquids and the like comprising a one-piece frame including a front rim portion and a portion extending rearwardly from said rim to define an eye chamber, a peripheral flange on said rearwardly extending portion adapted to fit closely against the face of the wearer to seal the junction therebetween, said rim defining a pair of eye apertures connected by a portion of reduced vertical extent above the nose of the wearer, a one-piece lens of flexible material adapted to be received within said rim and of complementary shape thereto, cooperating inner and outer spaced flange portions on the inner periphery of said rim forming a channel for receiving the periphery of said lens in close fitting relation to seal against the passage of gas around the edge of said lens into said eye chamber, a plurality of bolts extending through said flange portions and said lens, cooperating nuts on said bolts for compressing said lens into releasably sealed relation between said flange portions while providing for ready removal and replacement of said lens, said frame being entirely free of openings into said eye chamber except for said lens receiving portion to seal said eye chamber against the passage of gas from without, a head strap for supporting said frame on the head of the wearer, said frame having an apertured lug portion at each end thereof for receiving said strap therethrough, and means for securing said strap to said lugs to effect attachment of said head strap to said frame entirely exteriorly of said eye chamber to maintain said eye chamber sealed against gas in position on the head of the wearer.

JACK B. HIRSCHMANN.

References Cited in the file of this patent

UNITED STATES PATENTS

| Number | Name | Date |
|---|---|---|
| 2,435,653 | Maurer | Feb. 10, 1948 |
| 2,526,181 | Wilen | Oct. 17, 1950 |
| 2,552,409 | Ditto | May 8, 1951 |

FOREIGN PATENTS

| Number | Country | Date |
|---|---|---|
| 617,617 | Germany | Aug. 22, 1935 |